May 24, 1949. R. E. COOPER 2,471,060
FLEXIBLE SEWER ROD COUPLING FEELER
Filed July 14, 1947
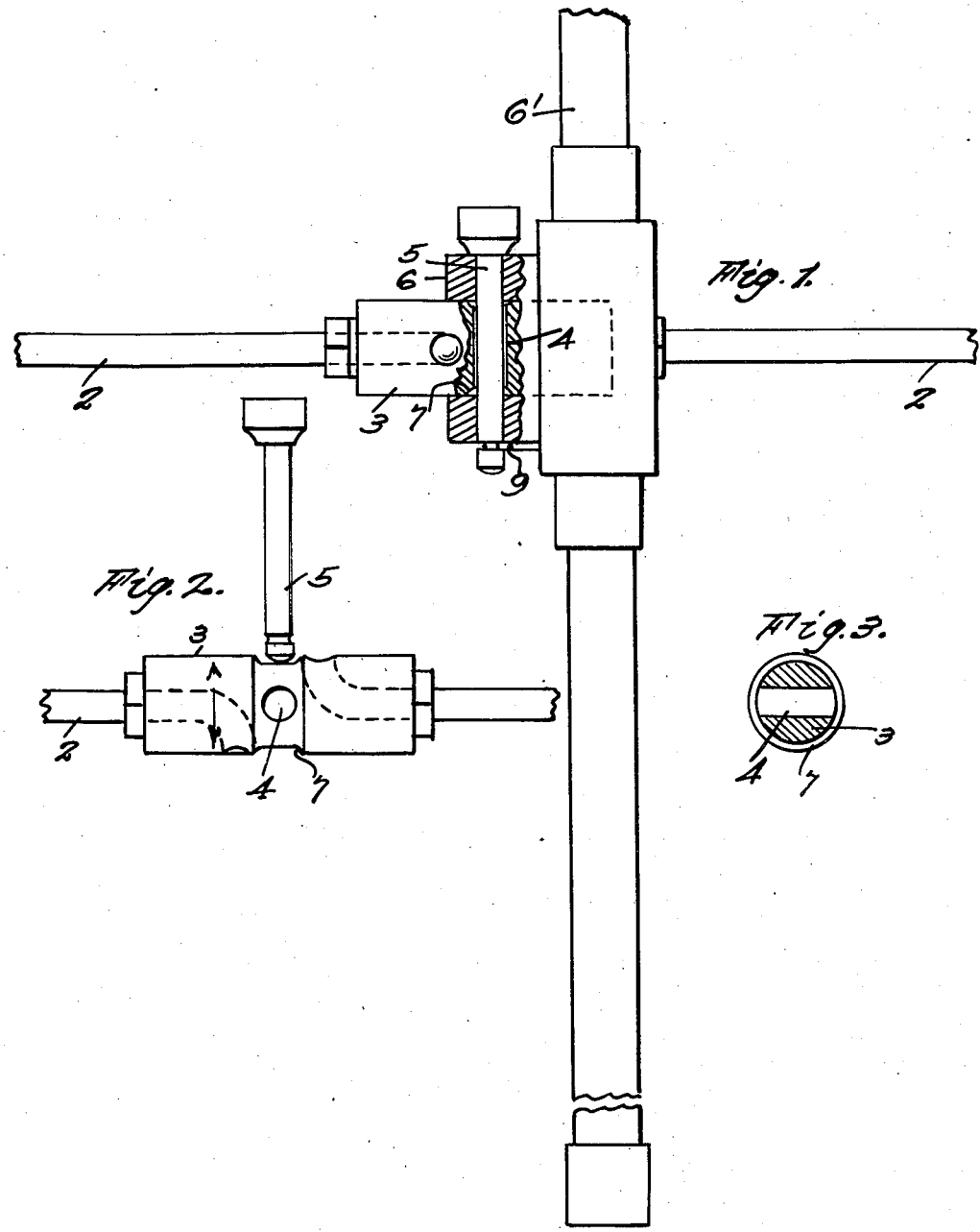
Robert E. Cooper,
INVENTOR;
By his attorney,
Frederick E. Maynard.

Patented May 24, 1949

2,471,060

UNITED STATES PATENT OFFICE 2,471,060

FLEXIBLE SEWER ROD COUPLING FEELER

Robert E. Cooper, Fort Monroe, Va., assignor to Flexible Sewer Rod Equipment Co., Los Angeles, Calif., a copartnership Application July 14, 1947, Serial No. 760,917

4 Claims. (Cl. 287—52.08)

Letters Patent No. 2,005,935 shows a lever device for use in operating flexible sewer rod apparatus, and Letters Patent No. 2,110,202 shows a generally used coupling for connecting contiguous ends of flexible steel rods employed in such apparatus.

These couplings are telescopic in respective socket parts of the lever devices and are interlocked therein by a removable locking pin entering a diametrical hole in the coupling body. Since the pin hole in the socket is wholly concealed in the lever device as the parts are temporarily interconnected for manipulation the socket must be randomed into proper position for diametrical insertion of the pin; in other words it is a blind operation to get the pin into the coupling hole. This means, under current scale of compensation of operators, the loss of quite some time for each assembly of a coupling in the operating lever, at a cents-per-minute financial loss.

Therefore, to greatly facilitate the actions of pinning a coupling in position in a lever socket is an immediate objective of this invention.

Further, an object of the invention is to provide for the fast interlocking of the coupling in the lever without any noticeable increase in the cost of the cooperating parts, and in a most simple and practical manner, and without additional operational elements.

The invention resides in certain advancements in this art as set forth in the ensuing disclosure and having, with the above, additional objects and advantages as hereinafter developed, and whose constructions, combinations and means and details thereof, and the manner of operation will be made manifest in the following description of the herewith illustrative embodiment; it being understood that modifications, variations and adaptations may be resorted to within the scope, spirit and principles of the invention as it is claimed in conclusion hereof.

Figure 1 is a sectional side elevation of the interpinned lever and socket assembly.

Figure 2 is an elevation of the isolated pin and socket in proper longitudinal adjustment to facilitate rotation of the pin as to the socket to quickly aline a socket pin hole with the pin.

Figure 3 is a cross-section of the socket through the pin hole, and the feeling-in groove.

Alined, steel rods 2 are securely interhooked in a joining coupling body 3 for co-rotation of a string of the rods, and for the rotation or the axial pulling of the coupled rods the coupling 3 has a diametrical hole 4. Into this hole there is adapted to be inserted a locking pin 5 which is removably mounted in a central socket 6 of a suitable lever device 6', by whose rotation the connected rods can be rotated, or if desired, pulled axially.

To interlock the socket with the desired string coupling 3 the latter is axially telescoped into the bore of the lever socket 6 while the pin 5 is shifted radially out of the way.

Heretofore the operator has had to work blindly until the concealed pin hole 4 in the coupling is brought into proper position for diametrical inthrust of the fastening pin 5.

In the instant invention the body of the coupling 3 is provided with an external groove 7 peripherally transverse to the axis of and is somewhat wider than the hole 4; each end of which is exposed in the bottom of the groove. Therefore, the operator merely shifts the coupling rapidly into the socket 6 until he feels the inwardly pressed pin drop into the groove, and he then rotates the lever in either direction (never more than 180°) and the pin is brought into alinement with the hole 4 and rapidly enters to full interpinning position.

The inserted pin is releasably held by a latch spring 9 on the socket.

What is claimed is:

1. In combination, a pull out and turning lever having a central socket for a rod coupling to be operated by the lever and having a diametrical locking pin, and a rod coupling telescopic in said socket and having a diametrical hole for registration with said pin; the body of the coupling having a peripheral groove entirely therearound for entry of the pin at any rotational position of the coupling and located to cross the ends of the coupling pin hole to facilitate the registration of the pin with the said hole while the coupling pin hole is wholly concealed in the lever socket.

2. A turning lever and a complementary rod coupling telescopic therein to be manipulated by the lever and having a transverse pin hole therethrough, and a pin insertable in said hole for interlocking the lever and the coupling for cooperation; the coupling having a feeling-in groove entirely around its circumference at said hole to facilitate register of the pin with the coupling in their effective interlocking position.

3. A rod coupling having a diametrical hole for a locking pin of a respective operative operating device and whose periphery is provided with a feeling-in groove entirely therearound and across the hole to facilitate register of the pin in the said hole.

4. A turning, lever device having a socket for a rod coupling to be operated thereby and having a movable locking pin, and a rod coupling telescopic in said socket and having a diametrical hole for registration with the pin; the body of the coupling having a peripheral feeling-in groove entirely therearound to which the hole opens at each of its ends.

ROBERT E. COOPER.

REFERENCES CITED

The following references are of record in the file of this patent:

UNITED STATES PATENTS

| Number | Name | Date |
| --- | --- | --- |
| 617,137 | Anthony | Jan. 3, 1899 |
| 825,891 | Browne | July 17, 1906 |
| 1,234,455 | Fox | July 24, 1917 |
| 1,343,733 | Linden | June 15, 1920 |
| 1,504,905 | Ruffcorn | Aug. 12, 1924 |